United States Patent [19]
Engfer

[11] 3,747,949
[45] July 24, 1973

[54] APPARATUS FOR MAINTAINING THE PRESSURE IN A PNEUMATIC SUSPENSION

[75] Inventor: Ortwin Engfer, Gerlingen, Germany

[73] Assignee: Robert Bosch GmbH, Stuttgart, Germany

[22] Filed: Mar. 18, 1971

[21] Appl. No.: 125,475

[30] Foreign Application Priority Data
Mar. 20, 1970 Germany .................. P 20 13 303.3

[52] U.S. Cl. .............................. 280/124 F, 417/38
[51] Int. Cl. .......................................... B60g 17/00
[58] Field of Search .................. 280/6, 6.11, 124 F, 280/124 LR; 335/126; 200/153 V

[56] References Cited
UNITED STATES PATENTS

| | | | |
|---|---|---|---|
| 2,919,929 | 1/1960 | Jackson | 280/124 F |
| 2,921,160 | 1/1960 | Lautzenhiser | 280/124 F |
| 3,264,008 | 8/1966 | Allinquant | 280/124 F |
| 3,584,893 | 6/1971 | Tuczek et al. | 280/124 F |
| 3,620,542 | 11/1971 | Hovorka | 280/124 F |

Primary Examiner—Charles J. Myhre
Assistant Examiner—Frank H. McKenzie, Jr.
Attorney—Michael S. Striker

[57] ABSTRACT

At sufficiently high pressure in a closed container, filling of, or discharge from the pneumatic suspension of a motor car is controlled by a level switch whose positions represent different relative positions between a chassis and wheel shafts of a motor car, depending on a load variation. When the pressure in the container drops, a pressure responsive switch causes a control valve to connect the pressure conduit and the suction conduit, of a compressor with the closed container and the outside air, respectively, unless the level switch is operated by load variation. Below a minimum pressure in the container, charging by the container is continued even if the level switch is operated.

10 Claims, 1 Drawing Figure

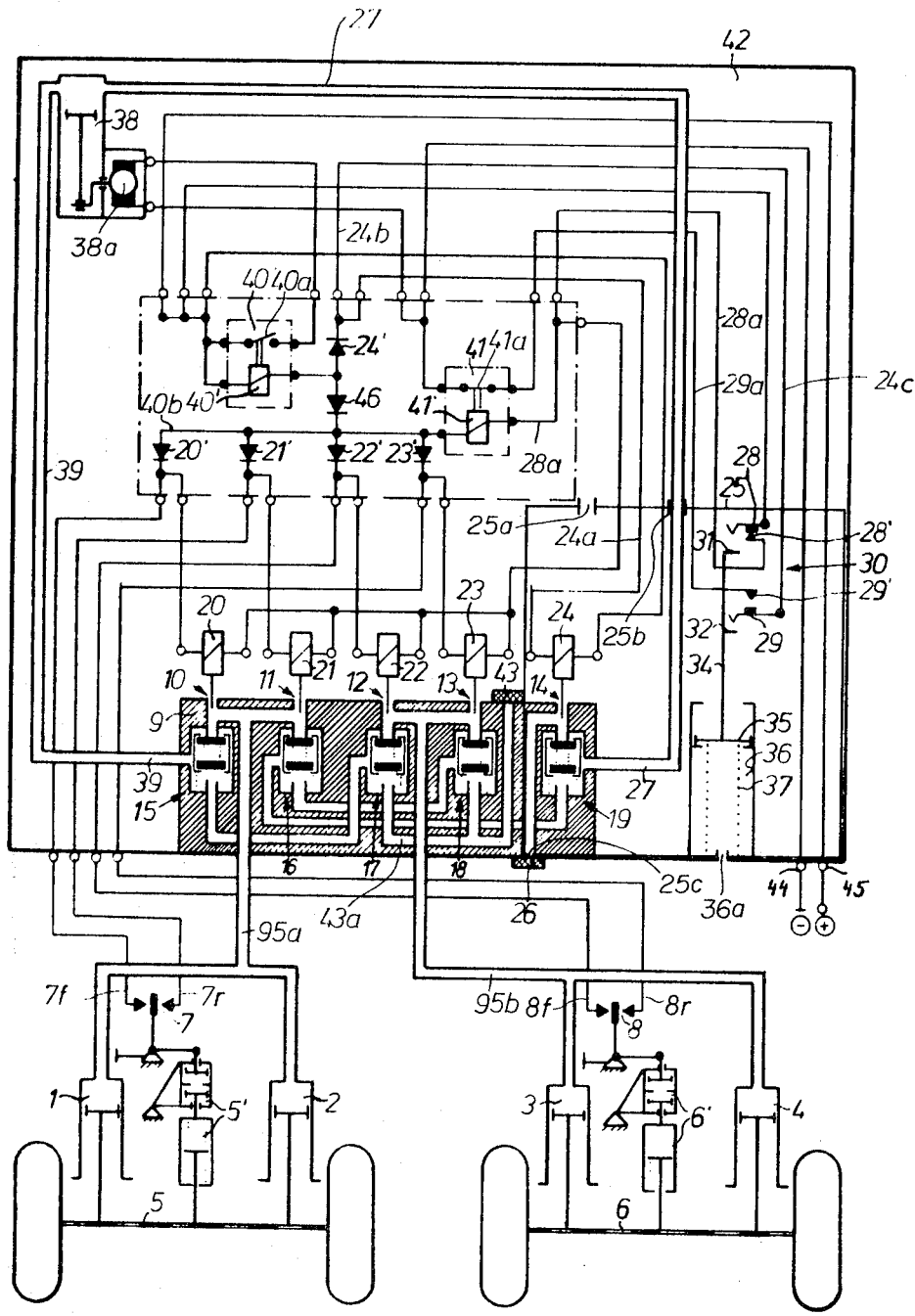

APPARATUS FOR MAINTAINING THE PRESSURE IN A PNEUMATIC SUSPENSION

BACKGROUND OF THE INVENTION

The German Pat. No. 1,263,524 discloses a pneumatic suspension for motor cars, including an electric motor-compressor, a closed container for air, level switch means for controlling the level of a chassis above the wheel shafts, and a charging device for maintaining the pressure in the closed container.

In the apparatus of the prior art, charging of the container takes place only if the pressure in the same has dropped below a predetermined value. In this event, air is sucked from the outside of the container, and pressed into the closed container, and when the desired pressure is again obtained, the charging device is disconnected.

The apparatus has the disadvantage that it may not be ready for use if the motor car is only rarely used, for example only on weekends. It may happen that insufficient air is available for compensating varying loads. The charging takes then several minutes until the chassis has reached its previous level above the wheel shafts. This detrimentally influences the readiness of the motor car for use.

SUMMARY OF THE INVENTION

It is one object of the invention to overcome the disadvantage of pneumatic suspensions according to the prior art, and to provide a pneumatic suspension which is always maintained in a condition permitting immediate use of the motor car.

Another object of the invention is to provide an automatic charging arrangement for maintaining the pressure in a closed container for air, at a desired pressure, and to prevent regulation of the level of the chassis, if the pressure in the air container has dropped below a predetermined minimum pressure.

With these objects in view, the invention provides a charging device with an electromagnetic charging valve, and a pressure-responsive switch which determines the range of operations of the charging device between a higher and a lower pressure. A control relay is controlled by the pressure responsive switch so that in a range between a higher and a lower pressure in the container, level adjusting takes place, if necessary, and below the lower pressure, the container is charged, irrespective of level differences caused by load variations.

One embodiment of the invention comprises level switch means having a position of rest, and operative high load and low load positions, assumed depending on the load acting on the suspension; a closed container for air under pressure; an electric motor-compressor; electromagnetic filler valve means controlled by the level switch means; electromagnetic relief valve means controlled by the level switch means; electromagnetic charging valve means having a charging position connecting the suction conduit of the compressor with air outside of the closed container, and the pressure conduit with the interior of the container; control switch means responsive to the pressure in the container to move to a first position when the pressure is above a predetermined high pressure, to a second position when the pressure is in a range below the predetermined high pressure and above a predetermined permissible pressure, and to a third position when the pressure is below the permissible pressure; and electric ontrol means controlled by the control switch means and by the level switch means, and controlling the electromagnetic charging valve means.

In the first position of the control switch means, the charging valve means is in the position of rest. In the second position, the charging valve means is in the charging position so that the container is charged with air until obtaining the predetermined high pressure, unless the level switch means moves to one of the operative positions and either the filler valve or the relief valve is actuated. In the third position, the filler valve and relief valve are deenergized by the control means, until at least the permissilbe pressure is obtained in the container.

In the preferred embodiment of the invention, the motor-compressor, the filler valve means, the relief valve means, the charging valve means and the pressure responsive control switch means are located in the container, and the container has an air inlet connected by the charging valve means in the charging position with a suction conduit of the compressor, and disconnected from the same in the position of rest of the charging valve means.

Preferably, the control switch means includes a cylinder, a piston in the cylinder forming a first chamber communicating with chamber outside of the container, and a second chambe communicating with air inside the container, an actuator mounted on the piston, a first pair of normally closed contacts opened by the actuator in the third position, and a second pair of normally open contacts, closed by the actuator in the second and third positions. The contacts are connected with the electric control means, which is preferably a relay having a relay contact controlling the energizing of the electromagnetic charging valve means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE of the drawing includes a schematic view of a pneumatic suspension for a motor car, and a diagram illustrating electric connections, and conduits for air, connecting schematically shown parts of the apparatus.

DESCRIPTION OF THE PREFERRED EMBODIMENT

A pneumatic suspension has two cylinder and piston means 1, 2 and 3,4 communicating with conduit 95a and 95b, respectively, and mounting a chassis, not shown, on the wheel shafts 5 and 6, respectively. A level adjusting device is provided for each wheel shaft, and include damping means 5' and 6', respectively, and level switch means 7,8 having an intermediate position of rest, and two operative positions, associated with a high load and a low load on the chassis, respectively, in which the movable switch arm of level switch 7 engages contacts 7f and 7r, or switch 8 engages contacts 8f and 8r, respectively. Contacts 7f and 8f are associated with filling of the cylinders of the suspension 1,2 and 3,4, and contacts 7r and 8r associated with releaving the pressure in the suspension.

The pneumatic suspension 1 to 4, and the level switches 7 and 8 are associated with a valve block 9 which consists of five electromagnetic valves 10, 11, 12, 13, and 14, each of which includes a double seat, valve members 15, 16, 17, 18 and 19, and electromagnetic means 20, 21, 22, 23, 24, by which the valve members are operated.

Valve means 10 to 13 control the filling and relief of the pneumatic suspension 1 to 4, and valve means 14 controls the charging of the closed container 42 with air when the pressure in the same has dropped.

More particularly, valves 10 and 12 are filler valves, and valves 11 and 13 are relief valves. The magnet windings 20, 21, 22, 23 are electrically connected with level switches 7 and 8.

The charging valve means 14 has a valve member 19 cooperating with two valve seats and having a charging position connecting an air inlet 26 on the closed casing 42 with a suction conduit 27, connected with a compressor 38 whose pressure conduit 39 communicates with filler valves 10 and 12. The magnetic winding 24 of charging valve means 14 is electrically connected with two movable contacts 28 and 29 of a pressure responsive control switch means 30, which forms part of the charging device. The two movable contacts 28 and 29 cooperate with two fixed contacts 28' and 29'.

The movable contacts 28 and 29 of control switch 30 are operated by actuator means 31 and 32 which are secured to a piston rod 34 of a piston 35 located in a cylinder 36 which contacts a spring 37. The pressure chamber 36 is preferably connected by an inlet 36a in a charging device container 25 and in the container 42 and with the outer air, while the pressure prevailing in the closed container 42 acts through an inlet 25a on piston 35 opposite to the direction of spring 37. Piston 35 and actuator means 31, 32 are responsive to the pressure in container 42. Contacts 28 and 28' are normally closed, and contacts 29 and 29' are normally open. In a first position of control switch 30, actuator means 31, 32, 35, which is responsive to the inner pressure in container 42, does not influence the two contacts pairs 28, 28' and 29, 29'. In a second position, when the pressure in container 42 is reduced, actuator portion 32 closes contacts 29, 29', and in a third position, when the pressure is further reduced, actuator portion 31 opens the pair of contacts 28, 28'. Charging device container 25 has an opening 25b for the suction conduit 27, and an opening 25c for the air inlet 26.

A motor compressor 38, 38a is located in the closed container 42, and has a pressure conduit 39 connected with a pressure air inlet of valve block 9. The motor 38a of compressor 38 is controlled by first electric control means including a motor relay 40 which has a motor relay winding 40' and a relay contact 40a controlling motor 38a. The electromagnetic means 24 of the charging valve means 14 is controlled by second electric control means including a relay 41 which has a relay winding 41' and a relay contact 41a.

One end of winding 41' is connected by a diode 46 with a conductor 41b which is connected by diodes 20', 21', 22', 23' with a first terminal of the electromagnetic means 20, 21, 22, 23, respectively, of the four valve means 10, 11, 12, and 13, while the electromagnetic winding 24 of the charging valve means 14 and diode 24' are closed by diode 46. The other side of winding 41' of control relay 41 is connected with the fixed contact 28', together with the respective other terminals of the magnet windings 20, 21, 22, and 23.

Compressor 38a motor 38', motor relay 40, control relay 41, valve block 9, and the charging device container 25, schematically indicated by a rectangle shown in a schematic section, are located in the closed container 42. The charging device in container 25 includes the charging valve means 14, and the pressure responsive switch means 30.

The interior of the closed casing 42 is connected with conduits in valve block 9 by an outlet 43, which can be connected with the valves 10, 11, 12, 13, 14 by ducts in the valve block 9 communicating with the pressure conduit 39 of compressor 38. Two terminals 44 and 45 are provided on the container 42, and are connected with negative and positive terminals of a voltage source.

OPERATION

When the motor car is in a normal condition, the pressure in the closed container 42 is above 6 atmosphere. Contacts 28, 28' of control switch 30, are closed, and contacts 29, 29' are open, and control switch 30 is in a first position which the magnetic windings 20 to 24, and 40' and 41' are connected to the positive terminal 45, while the motor 38a is connected with the negative terminal 44. All electric devices are in a position of rest.

If the load on the suspension is increased, and the chassis, not shown, drops with cylinders 1, 2, 3, 4, the movable switch arm of level switch 7, for example, engages contact 7f, the winding 40' of motor relay 40 energizes, the relay contact 40a energizes the motor of compressor 38, winding 41' of control relay 41 is energized, and due to the shifting of the relay contacts 40a and 41a, and of the electromagnetic filler valve means 10, the cylinders 1 and 2 of the pneumatic suspension are filled. When due to a reduced load, level switch 7 moves to engage contact 7r in a low load position, the electromagnetic relief valve means 11 is shifted to a position in which air from conduit 39 is discharged through duct 43a in valve block 9, and through the outlet 43 into the interior of container 42.

Corresponding operations takeplace when the level switch 8 associated with wheel shaft 6 assumes high load positions engaging the left contact, or a low load position engaging the right contact thereof. Filler valve means 12 effects the filling of the suspension 3, 4 through conduit 95b, and in the other position of level switch 8, relief valve means 13 effects discharge from suspension system of wheel shaft 6 through duct 43a and outlet 43.

If it is necessary to simultaneously fill the cylinders 1 to 4 of both suspensions associated with wheel shafts 5 and 6, the two filler valve means 10 and 12 are operated, if filling is required, and relief valve means 11 and 13 are shifted, if relief of the suspension system is required, and indicated by corresponding positions of the level switch means 7 and 8.

It is assumed that the pressure in container 42 should be at least 6 atm. and if the pressure in container 42 drops to a pressure within the range between 3 and 6 atm., the charging device 25 is rendered operative. When the pressure responsive piston 25 responds to a pressure drop below 6 atm., it moves to a position in which actuator means 32 engages the movable contact 29 and causes the same to engage the fixed contact 29'. However, actuator means 31 does not yet engage the movable contact arm 28', so that the normally closed pair of contacts 28, 28' remains closed in this second position of control switch 30.

When contacts 29, 29' engage, motor relay 40 and control relay 41 are closed, and the electromagnetic winding 24 of charging valve 14 is energized through conductor 24a, 24b, 24c. Compressor 28 sucks air from outside of the container 42 through the air inlet 26 into the suction conduit 27 which is connected by charging valve 14 with air inlet 26. The pressure conduit 39 presses the air through duct 43a in valve block 9 and through outlet 43 into the interior of the container 42.

As long as actuator means 31 does not engage the movable contact 28 and connects the same with the fixed contact 28', which takes place when the pressure has dropped in container 42 to 3 atm., for example, charging of the container can be interrupted at any time when filling or relieving of the suspension is required, and indicated by a displacement of the respective level switch 7 or 8. For example, if level switch 7 engages the contact 7f, the magnetic winding 20, and control relay 41 are connected to the voltage, and the conductor 24a, which connects the electromagnetic means 24 with the negative terminal 44, is interrupted. Suspension cylinders 1 and 2 are filled through conduit 95a which communicates with pressure conduit 39 of compressor 38 due to the shifting of filler valve 10, for example.

If the pressure in container 42 drops below the permissible pressure of 3 atm., actuator means 31 opens the normally closed contact pair 28, 28' by displacing the movable contact 28', while contacts 29, 29' remain engaged and closed. Actuator means 34, 32, 31 perform this movement when the pressure in container 42, and acting on piston 35, drops to 3 atm.

In this third position of control switch 30, the line 28a from contact 28' to control relay 41, which leads to one terminal of magnetic windings 20, 21, 22, 23, is interrupted and disconnected from line 41b. Electromagnetic valve means 10 to 13 cannot be controlled by the level switch means 7 and 8 to fill the suspension systems 1,2 and 3,4 when the load is increased, and to relieve the suspension system when the load is reduced.

When the pressure of 3 atm. is again obtained, piston 35 moves actuator means 31 so that contacts 28, 28' again engage each other, permitting the level switches 7 and 8 to start filling or relieving operations, but if no such adjustments of the pressure in the suspension are necessary, the filling of container 42 is continued until the pressure of 6 atm. is again reached, whereupon the actuator means 32 permits contacts 29, 29' to separate so that charging of the container is discontinued.

The apparatus of the invention has a particularly good effect if the pressure differential between the higher and lower limits is so great that the air stored in container 42 is sufficient for a complete change of the load acting on the chassis and suspension.

It will be understood that each of the elements described above, or two or more together, may also find a useful application in other types of suspensions differing from the types described above.

While the invention has been illustrated and described as embodied in a pressure responsive switch in a closed air container controlling the charging of the air container, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Apparatus for maintaining the pressure in a pneumatic suspension, comprising level switch means having a position of rest, and operative high load and low load positions assumed depending on the load acting on said suspension; a closed container for air under pressure; electric motor-compressor means having a pressure conduit and a suction conduit; first electric control means controlled by said level switch means and controlling said motor-compressor; electromagnetic filler valve means controlled by said level switch means to connect in said high load position said pressure conduit with said pneumatic suspension; electromagnetic relief valve means controlled by said level switch means to connect in said low load position said pneumatic suspension with the interior of said closed container; electromagnetic charging valve means having a position of rest, and a charging position connecting said suction conduit with air outside said closed container and said pressure conduit with the interior of said container for increasing the pressure in the same; control switch means responsive to the pressure in said container to move to a first position when the pressure in the same is above a predetermined high pressure, to a second position when said pressure is in a range below said predetermined high pressure and above a predetermined permissible pressure, and to a third position when said pressure is below said permissible pressure; and second electric control means controlled by said control switch means and by said level switch means and controlling said electromagnetic charging valve means so that in said first position of said control switch means said charging valve means is in said position of rest, so that in said second position said charging valve means is in said charging position whereby said container is charged with air until obtaining said predetermined high pressure, unless said level switch means moves to one of said operative positions and the respective valve means of said filler and relief valve means is actuated, and so that in said third position said filler valve means and said relief valve means are deenergized by said second control means until at least said permissible pressure is obtained in said container.

2. Apparatus as claimed in claim 1 wherein said pressure responsive control switch means is located in said container.

3. Apparatus as claimed in claim 1 wherein said control switch means includes a cylinder, a piston in said cylinder forming a first chamber communicating with air outside of said container, and a second chamber communicating with air inside said container, an actuator mounted on said piston, a first pair of normally closed contacts opened by said actuator in said third position, and a second pair of normally open contacts closed by said actuator in said second and third positions; and wherein said contacts are connected with said second electric control means.

4. Apparatus as claimed in claim 3 wherein said second electric control means includes a relay having a winding and a relay contact operated by said winding; wherein said normally closed contacts connect said winding with one terminal of a voltage; and wherein said normally open contacts and said relay contact connect the other terminal of the voltage with said electromagnetic charging valve means.

5. Apparatus as claimed in claim 1 wherein said relief and filler valve means, and said charging valve means form a valve block located in said closed container.

6. Apparatus as claimed in claim 1 wherein said filler valve means, relief valve means, and said charging valve means each includes two valve seats, a movable valve member cooperating with said two valve seats, and electromagnetic means for operating said valve member.

7. Apparatus as claimed in claim 1 wherein said motor-compressor, said suction conduit, said pressure conduit, said filler valve means, said relief valve means, and said charging valve means are located in said container; wherein said container has an air inlet connected by said charging valve means in said charging position with said suction conduit, and disconnected from the same in said position of rest of said charging valve means; wherein said pressure responsive control switch means is located in said container; wherein said control switch means includes a cylinder, a piston in said cylinder forming a first chamber communicating with air outside of said container, and a second chamber communicating with air inside said container, an actuator mounted in said piston, a first pair of normally closed contacts opened by said actuator in said third position, and a second pair of normally open contacts closed by said actuator in said second and third positions; and wherein said contacts are connected with said second electric control means.

8. Apparatus as claimed in claim 1, wherein said motor-compressor means includes a compressor and an electric motor, and wherein said first electric control means include a motor relay having a winding and a relay contact controlling said electric motor; and wherein said winding is electrically connected with said level switch means.

9. Apparatus as claimed in claim 1, wherein said filler valve means, and said charging valve means form a valve block located in said closed container; wherein filler valve means, said relief valve means and said charging valve means each includes two valve seats, a movable valve member cooperating with said two valve seats, and electromagnetic means for operating said valve member; wherein said motor compressor includes a compressor, an electric motor; wherein said first electric control means include a motor relay having a winding and a relay contact controlling said electric motor; and wherein said winding is electrically connected with said level switch means.

10. Apparatus for maintaining the pressure in a neumatic suspension, comprising level switch means having a position of rest, and operative high load and low load positions assumed depending on the load acting on said suspension; a closed container for air under pressure; electric motor-compressor means having a pressure conduit and a suction conduit; electromagnetic filler valve means controlled by said level switch means to connect in said high load position said pressure contuit with said pneumatic suspension; electromagnetic relief valve means controlled by said level switch means to connect in said low load position said pneumatic suspension with the interior of said closed container; electromagnetic charging valve means having a position of rest, and a charging position connecting said suction conduit with air outside said closed container and said pressure conduit with the interior of said container for increasing the pressure in the same; control switch means responsive to the pressure in said container to move to a first position when the pressure in the same is above a predetermined high pressure, to a second position when said pressure is in a range below said predetermined high pressure and above a predetermined permissible pressure, and to a third position when said pressure is below said permissible pressure; and electric control means controlled by said control switch means and by said level switch means and controlling said electromagnetic charging valve means; said motor-compressor, said suction conduit, said pressure conduit, said filler valve means, said relief valve means, and said charging valve means being located in said container; said container having an air inlet connected by said charging valve means in said charging position with said suction conduit, and disconnected from the same in said position of rest of said charging valve means, so that in said first position of said control switch means said charging valve means is in said position of rest, so that in said second position said charging valve means is in said charging position whereby said container is charged with air until obtaining said predetermined high pressure, unless said level switch means moves to one of said operative positions and the respective value means of said filler and relief valve means is actuated, and so that in said third position said filler valve means and said relief valve means are deenergized by said control means until at least said permissible pressure is obtained in said container.

* * * * *